3,423,454
PRODUCTION OF SULPHONIC ACIDS
Stanley Frederic Marrian, Fife, Scotland, assignor to British Hydrocarbon Chemicals Limited, London, England
No Drawing. Filed May 14, 1965, Ser. No. 455,961
Claims priority, application Great Britain, May 27, 1964, 22,012/64
U.S. Cl. 260—513           3 Claims
Int. Cl. C07c *143/02*

ABSTRACT OF THE DISCLOSURE

In the sulphoxidation normal paraffins having at least 8 carbon atoms in the molecule by reaction with sulphur dioxide and oxygen to give sulphonic acids, the sulphonic acids are separated from by-product sulphuric acid by carrying out the reaction in the presence of a chlorinated hydrocarbon having up to two carbon atoms and at least two chlorine atoms in the molecule, chlorinated hydrocarbon/hydrocarbon phase containing most of the sulphonic acid being separated from a sulphuric acid phase. Examples of the chlorinated hydrocarbon are chloroform, carbon tetrachloride, tetrachloroethane or 1,2-dichloroethane.

---

The present invention relates to the production of sulphonic acids.

The production of sulphonic acids by the reaction of hydrocarbons with sulphur dioxide and oxygen in a sulphoxidation reaction is already known. In the reaction sulphuric acid is produced as a by-product, and the practical and economical separation of this from the sulphonic acid product is difficult.

According to the present invention the process for the production of sulphonic acids comprises reacting an aliphatic hydrocarbon containing at least 8 carbon atoms in the molecule with sulphur dioxide and oxygen in a sulphoxidation reaction carried out in the presence of an organic solvent for the sulphonic acid which is substantially inert to the sulphoxidation conditions and separating a solvent/hydrocarbon phase containing most of the sulphonic acid from a sulphuric acid phase.

Particularly suitable starting materials are normal paraffins, and the use of long chain paraffins is preferred. We have found with aliphatic hydrocarbons having 7 or less carbon atoms in the molecule that no useful separation of sulphonic acids from sulphuric acid takes place on the addition of organic solvents e.g. carbon tetrachloride to the sulphoxidation.

Preferred organic solvents include polyhalogenated lower hydrocarbons, which may most suitably contain from one or two carbon atoms and at least two chlorine atoms in the molecule, for instance chloroform, carbon tetrachloride, tetrachloroethane and 1,2-dichloroethane. It has been found that when the sulphoxidation reaction is carried out in the presence of such solvents the resulting reaction product separates into two phases, a solvent/hydrocarbon phase containing most of the sulphonic acid and a sulphuric acid phase, which can readily be separated from each other. By removing the sulphuric acid phase, the sulphonic acid reaction product is obtained free from at least the major part of the sulphuric acid.

Except for the presence of the solvent, the reaction conditions for the sulphoxidation reaction according to the process of the present invention are conventional. The reaction may be initiated by illuminating the reactants with actinic light, or by the presence of a heavy salt of an organic acid, as described in our co-pending application, B.A. 21,423/64, or by the use of organic acids as described in our copending application 24,526/64.

The process is particularly suitable for the production of sulphonic acids for use in the manufacture of alkane sulphonate detergents by sulphoxidation of paraffins. By neutralisation of the acids in the solvent/hydrocarbon layer either before or after extraction with water, a detergent sulphonate is obtained having an acceptably low level of sulphate, without the necessity of expensive processing steps to reduce the inorganic salt content of the product. The solvent/hydrocarbon layer after extraction of the acids with water can be returned to the sulphoxidation reaction after drying if necessary.

Example 1

A $C_{10}$–$C_{13}$ normal paraffin feedstock dissolved in chloroform to give a volume ratio of solvent:paraffin of 1:2 was sulphoxidised at 25° C. with a mixture of 2 parts by volume of gaseous sulphur dioxide with 1 part of oxygen. The reaction mixture was irradiated with a lamp emitting both ultraviolet and visible light. A lower layer separated from the reacting phase, and this was withdrawn and analysed for sulphuric, and sulphonic acid contents. After steady operation had been achieved the separating denser acid was found to cotnain 77% of the sulphuric acid present in the total reaction product, whilst the upper layer of solvent and hydrocarbon contained 88% of the sulphonic acid formed.

When the reaction was carried out with the same feedstock, but with no solvent present, the lower acid layer contained 75% of the sulphuric acid formed, and the upper hydrocarbon layer contained only 50% of the sulphonic acid produced.

Example 2

The sulphoxidation of Example 1 was repeated with the same feedstock and under the same conditions, but with addition of carbon tetrachloride in place of chloroform at a ratio of solvent to paraffin of 2:1. The lower acid layer separating proved in this case to contain 78% of the sulphuric acid formed, and the upper hydrocarbon-solvent layer contained 90% of the sulphonic acid produced in the system.

Replacement of the carbon tetrachloride with tetrachloroethane gave very similar results.

Example 3

Sulphoxidation processes were carried out under the same conditions as Example 1 but with varying proportions of solvent and $C_{10}$–$C_{13}$ paraffin, the results being shown in the following table.

| Solvent used | Volume ratio of solvent: $C_{11}$–$C_{13}$ paraffin | Active agent production, gm./litre/hr. | Percent of sulphuric acid formed found in lower layer | Percent of sulphonic acid formed found in upper layer |
|---|---|---|---|---|
| Chloroform | 2.1 | 1.2 | 59 | 100 |
| | 1.1 | 9.8 | 66 | 87 |
| | 1.2 | 19.6 | 77 | 88 |
| Carbon tetrachloride. | 2.1 | 13.6 | 78 | 90 |
| | 1.1 | 25.4 | 84 | 75 |
| | 1.2 | 38.2 | 83 | 70 |

I claim:
1. A process for the production of sulphonic acids which comprises reacting a normal paraffin containing at least 8 carbon atoms in the molecule with sulphur dioxide and oxygen in a sulphoxidation reaction carried out in the presence of a chlorinated hydrocarbon having up to 2 carbon atoms and at least 2 chlorine atoms in the molecule and separating a chlorinated hydrocarbon/hydrocarbon phase containing most of the sulphonic acid from a sulphuric acid phase.

2. A process according to claim 1 wherein the chlorinated hydrocarbon is chloroform, carbon tetrachloride, tetrachloroethane or 1,2-dichloroethane.

3. A process according to claim 1 wherein a $C_{10}$–$C_{13}$ normal paraffin feedstock is subjected to the sulphoxidation reaction.

References Cited

UNITED STATES PATENTS

| 2,511,043 | 6/1950 | Busch | 260—513 |
| 3,260,741 | 7/1966 | Mackinnon et al. | 260—513 |

FOREIGN PATENTS 831,095   2/1952   Germany.

OTHER REFERENCES

Orthner, Agnew. Chem. 62 (1950), pp. 302–305.

DANIEL D. HORWITZ, *Primary Examiner.*